US006321198B1

United States Patent
Hank et al.

(10) Patent No.: US 6,321,198 B1
(45) Date of Patent: Nov. 20, 2001

(54) APPARATUS FOR DESIGN AND SIMULATION OF DIALOGUE

(75) Inventors: Wayne Arnold Hank, Quakertown; Raymond Alan Diedrichs, Chalfont; James Scott Irwin, Stevens; Joseph Patrick Walsh, Spring City, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/255,900

(22) Filed: Feb. 23, 1999

(51) Int. Cl.[7] .................................................. G10L 15/22
(52) U.S. Cl. .......................... 704/270; 704/275; 704/272
(58) Field of Search .................................... 704/270, 251, 704/272, 257, 275; 379/88.01, 88.13

(56) References Cited

U.S. PATENT DOCUMENTS

| 5,045,994 | * | 9/1991 | Belfer et al. ............................ 703/25 |
| 5,390,279 | | 2/1995 | Strong ...................................... 395/2 |
| 5,642,519 | | 6/1997 | Martin .................................. 395/759 |
| 5,652,789 | * | 7/1997 | Miner et al. ......................... 379/201 |
| 5,748,841 | * | 5/1998 | Morin et al. ......................... 704/257 |
| 5,748,974 | | 5/1998 | Johnson ............................... 395/759 |
| 5,777,614 | * | 7/1998 | Ando et al. .......................... 345/333 |
| 5,864,808 | * | 1/1999 | Ando et al. .......................... 704/251 |
| 6,044,347 | * | 3/2000 | Abella et al. ........................ 704/272 |

* cited by examiner

Primary Examiner—William Korzuch
Assistant Examiner—Daniel Abebe
(74) Attorney, Agent, or Firm—John B. Sowell; Mark T. Starr

(57) ABSTRACT

A novel dialogue design system is provided for creating dialogue applications of the type understood and used by automatic speech recognition systems. The dialogue design system is loaded into a computer having a display and a control keyboard and comprises a novel Dialogue Assistant (DA). The DA is controlled from the keyboard and comprises a navigator screen for defining and connecting compartments of the dialogue application. Each said compartment of a dialogue application is provided with an associated design and editing screen which enables the designer to create, build and edit compartments with associated sounds and variables. Compartments or parts of the dialogue may be played back or used in an actual or simulated environment until the application is proven and ready for use. The dialogue flow may be converted into a machine readable code used by interactive voice response systems with a minimum requirement for manual or machine software implementation.

18 Claims, 13 Drawing Sheets

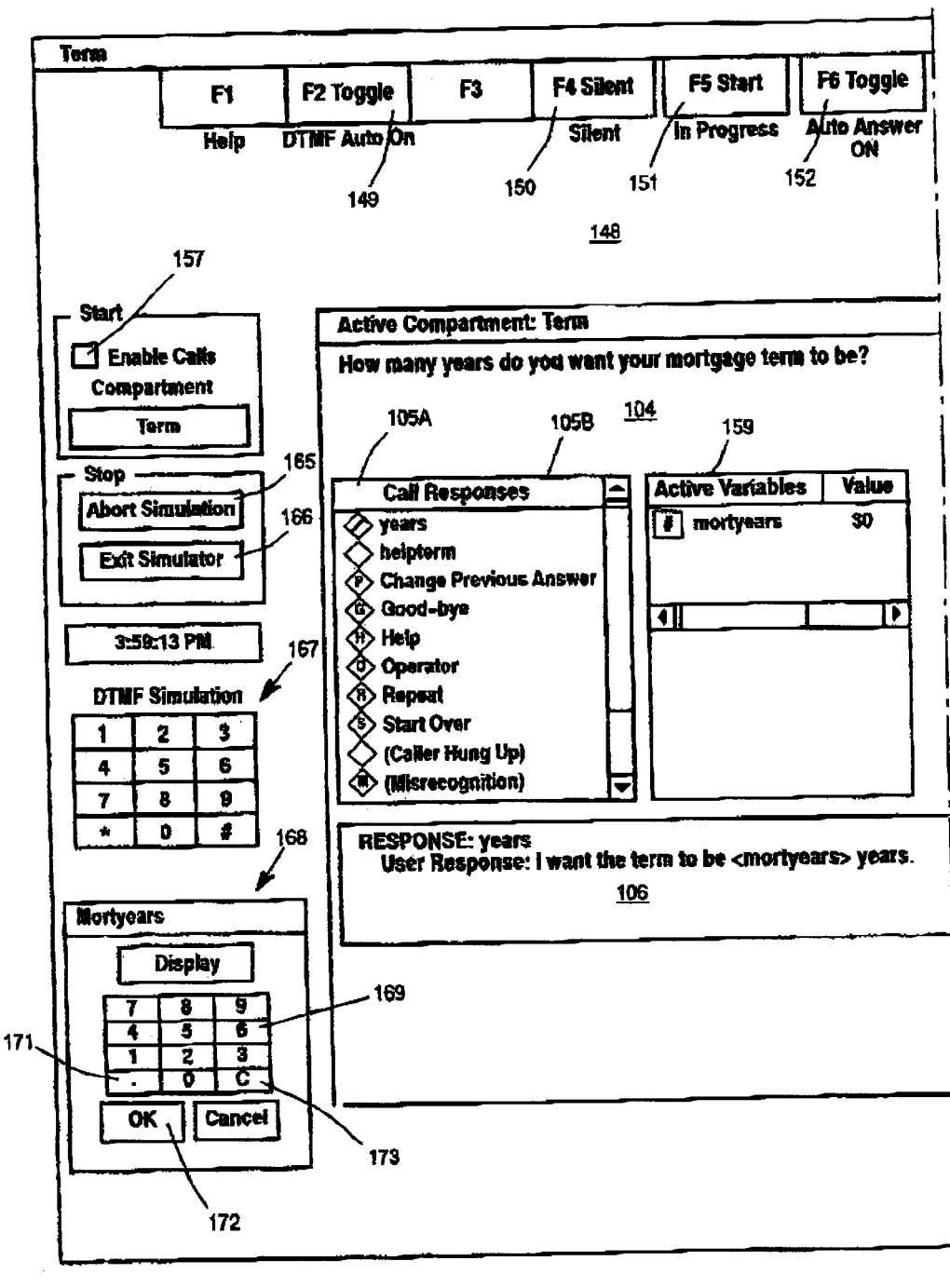
Figure 11A | Fig. 11A | Fig. 11B

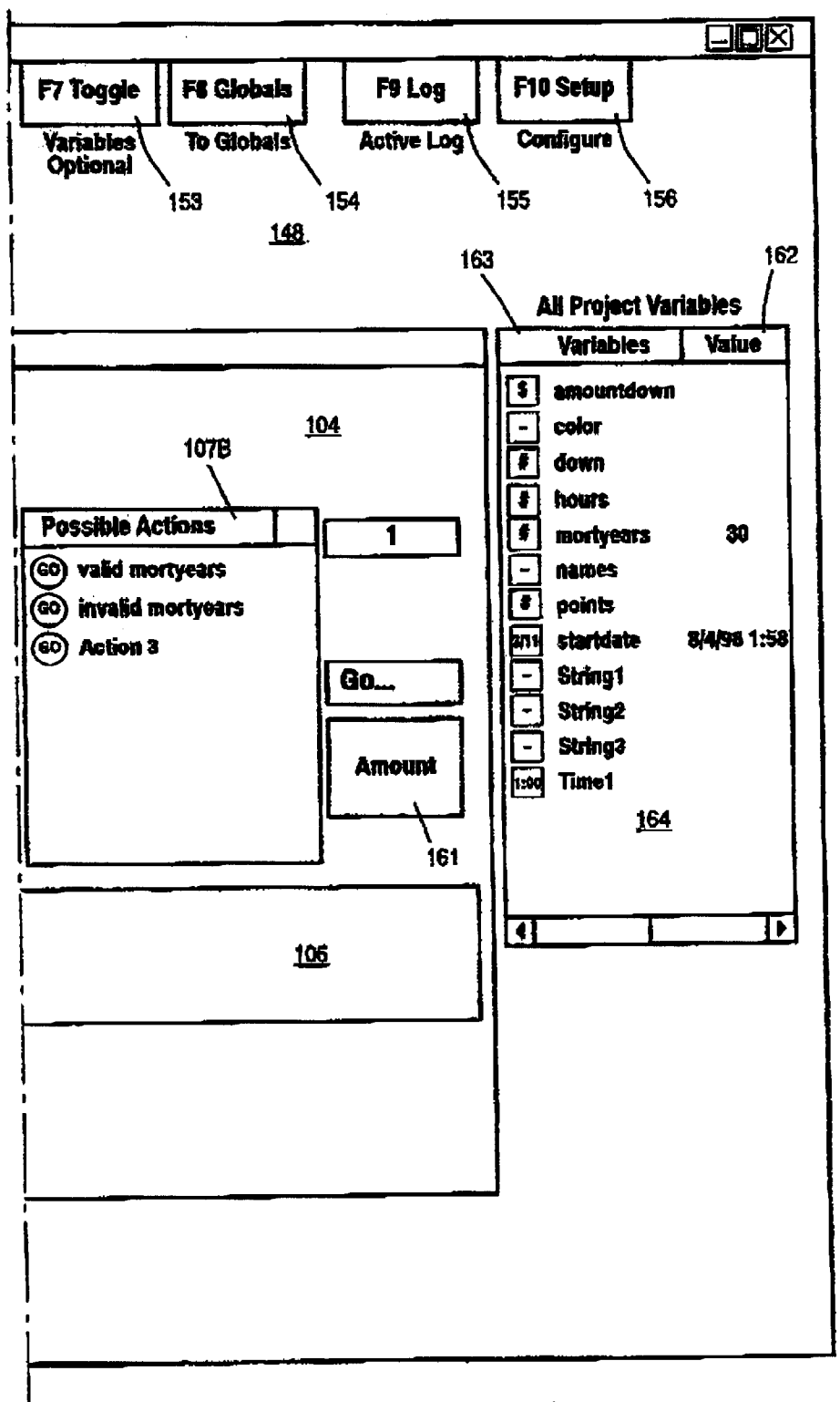
Figure 11 B | Fig. 11A | Fig. 11B

APPARATUS FOR DESIGN AND SIMULATION OF DIALOGUE

BACKGROUND OF THE INVENTION

1. Related Applications

This application relates to and employs teachings set forth in our copending application's referenced below which comprise a part of the prior art.

U.S. Ser. No. 08/932,938 for a System and Method for Speech Enabled Application and U.S. Ser. No. 08/932,937 for a System and Method for Creating a Language Grammar were filed Sep. 17, 1997 and are incorporated by reference herein.

2. Field of the Invention

The present invention broadly relates to tools for use by designers of natural language dialogues. More particularly, the present invention relates to computer software tools which simplify the design of dialogues and permit confirmation of the correctness of a design by means of simulation rather than requiring final software implementation of a design before correctness of the design can be confirmed.

3. Description of the Prior Art

Heretofore, dialogue designers were required to complete a design or part of a design using manual techniques. Subsequently, the designer or the design system required an interactive voice responsive (IVR) component or other voice activated systems to be implemented in order to test or confirm the effectiveness of the design. The dialogue designer was of necessity a very highly skilled person and the prior art system of implementation was both time consuming and costly.

Accordingly, it would be highly desirable to provide a dialogue design tool that would enable dialogue designers of lesser skill to design dialogues that may be proven by simulation before implementation.

SUMMARY OF THE INVENTION

It is the primary object of the present invention to provide a dialogue designer with tools which permit a dialogue design to be created in a database where it can be simulated by other tools which test and confirm the correctness of the dialogue before implementation.

It is another principle object of the present invention to provide an apparatus and method enabling a dialogue to be expressed in a database.

It is another principle object of the present invention to simulate the use of the dialogue and document that use for purposes of implementation by a database.

It is another principle object of the present invention to provide a general purpose dialogue tool for enhancing the effectiveness of dialogue designers.

It is principle object of the present invention to provide a computer driven Natural Language Speech Assistant (NLSA) for use by developers of Interactive Voice Response (IVR) applications.

It is principle object of the present invention to provide IVR developers with a NLSA tool that virtually eliminates a need for specialized knowledge of speech, linguistics or Backus-Naur Format (BNF) coding to create new or enhanced existing IVR spoken language applications.

It is the principle object of the present invention to provide a novel NLSA for use in IVR applications that is compatible with commercially available Automatic Speech Recognition (ASR) systems, thus, permitting substitution or upgrading of the latest ASR units.

It is a principle object of the present invention to provide a novel NLSA tool which is employed for development of an IVR application and comprises a novel Dialogue Assistant (DA) component that is also used for dialogue simulation.

It is a principle object of the present invention to provide a NLSA system which permits construction of a call flow application using a Dialogue Assistant (DA) component enabling designers to verify the call flow cycle by simulation of the application before finalizing the application and writing code.

It is another object of the present invention to provide a NLSA system for designing and demonstrating prototype applications or component parts of an IVR application.

It is another object of the present invention to provide a plurality of novel tools in a DA which enables an IVR developer to design and simulate a call flow application through the early stages of development of the application and to permit automatic or manual fault-free implementation of any part of the application.

It is another object of the present invention to provide a novel NLSA system for creating dialogue design components-such as prompts, anticipated responses, and replies used as building blocks in a DA.

It is another object of the present invention to interpose a human observer monitor into the call flow response during simulated run time to further perfect rapid interaction between the caller and the simulated dialogue.

It is general object of the present invention to provide a NLSA comprising a unique set of development tools and run time components that enable IVR developers to design, create, proof and run call flow applications which engage callers in an intelligent spoken dialogue and eliminate keypad and single hyphen word answers.

It is general object of the present invention to provide a novel call and/or dialogue flow development kit that may be integrated into ASR systems for IVR developers which permits checking and monitoring of steps during development.

According to these and other objects of the present invention there is provided a novel DA that permits a dialogue to be defined in terms of system prompts, caller responses, system replies and dialogue flow which is combined into a human readable output in the form of a design specification document. Having partially or totally completed a dialogue design in an associated database, the designer is capable of conducting a simulation of the design so as to test and confirm its effectiveness using the novel DA before implementation.

BRIEF DESCRIPTION OF THE DRAWINGS

FIG. 11 is a drawing showing a main display screen of the display during simulation and tests.

DESCRIPTION OF THE PREFERRED EMBODIMENTS

Figure 1:
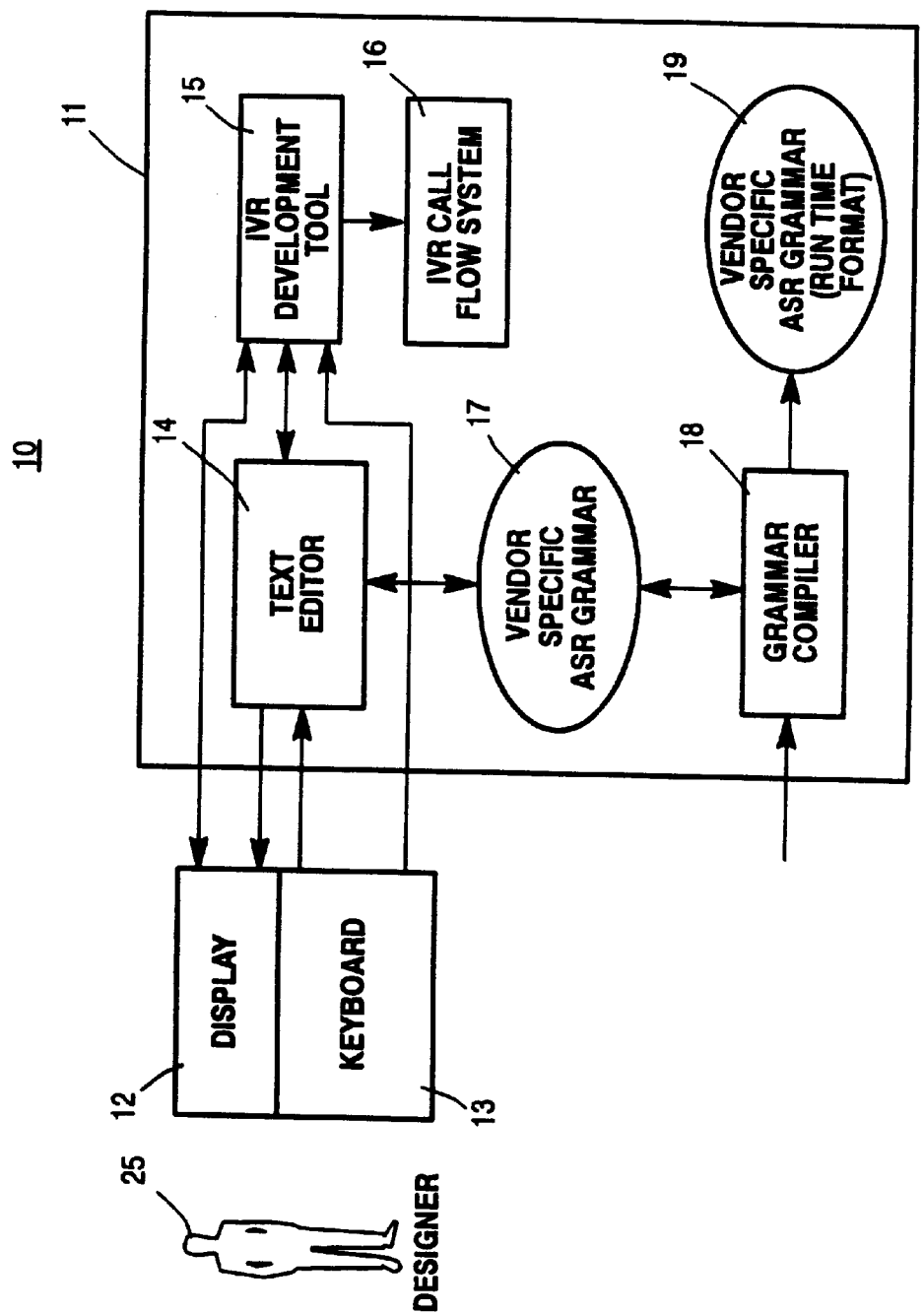
FIG. 1 is a block diagram showing a prior art design and implementation system for producing a deployable Interactive Voice Response (IVR) software program.

Refer now to FIG. 1 showing a prior art design and implementation system 10 which comprises a computer 11 having a display 12 and keyboard 13 coupled to a text editor 14. The text editor 14 calls up information out of the IVR development tool 15 under control the keyboard 13 and edits the information which is then used by the IVR development tool 15 to produce the IVR call flow system 16.

In parallel there with the text editor 14 is used by the designer to create the vendor specific ASR grammar 17 which are then translated by the grammar compiler 18 to produce the vendor specific ASR grammar in run time format as shown at block 19.

Figure 2:
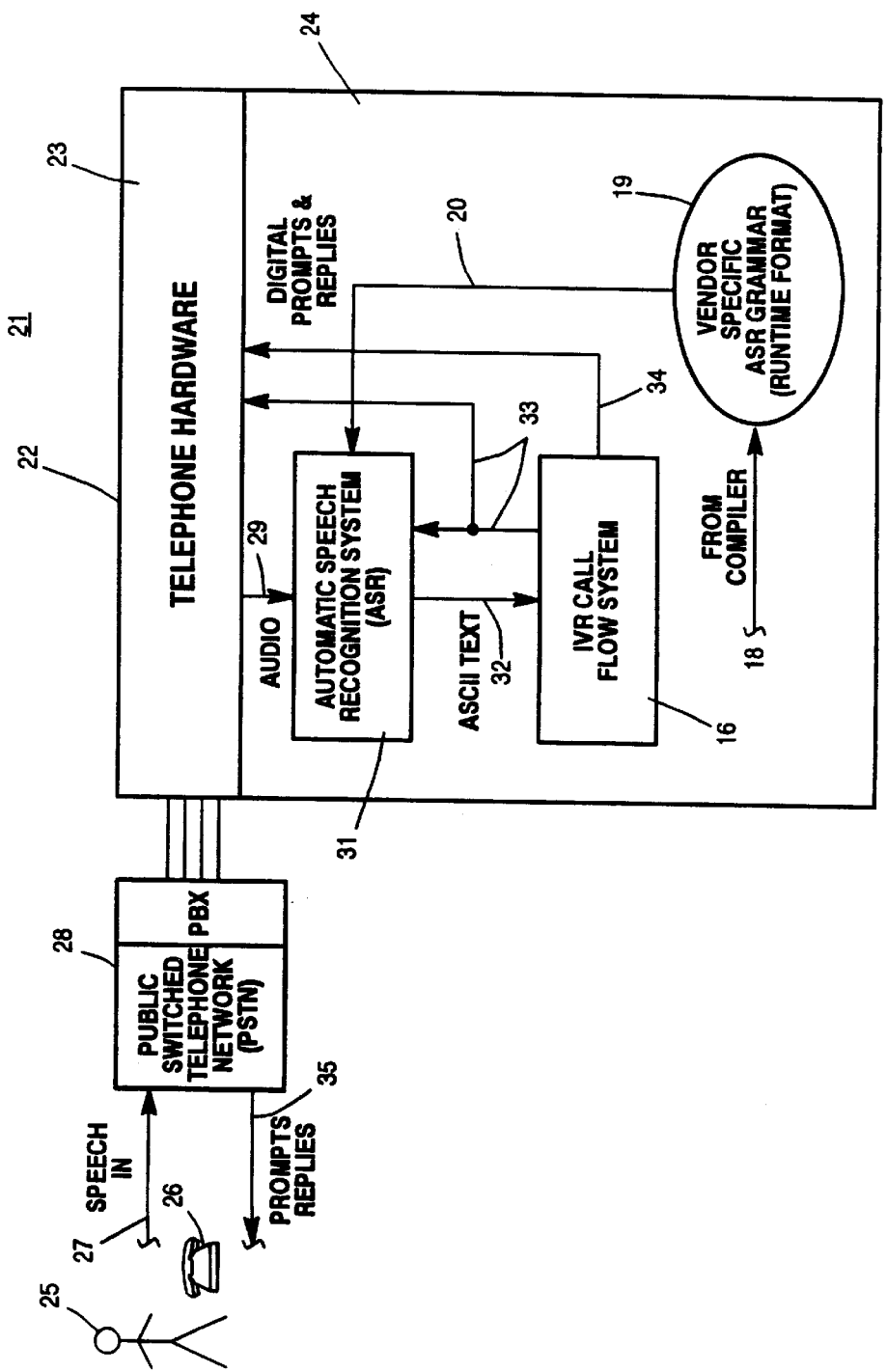
FIG. 2 is a block diagram showing a prior art run time IVR system.

Refer now to FIG. 2 showing the prior art run time IVR system 21 which comprises a computer 22 having telephony hardware 23 and a plurality of software 24 to be explained hereinafter. In the embodiment to be explained, a caller 25 having a telephone 26 operates through a telephone system 28 and the telephone hardware 23 to utilize the run time system 21. Caller speech on line 29 is received by an ASR system 31 which produces ASCII text on line 32 which is applied as an input to the aforementioned IVR call flow system 16. The call flow system 16 produces controls on lines 33 coupled to the ASR system 31 and the telephony hardware 23 and also produces digital prompts and replies on line 34 which are coupled to the telephony hardware 23 and the telephone system 28 via line 35 to the caller 25. Using the system 21, the caller's voice speech may be recognized and understood and the IVR system 16 can perform its intended function in the form of digital prompts and replies as well as other components of benefit to the caller 25.

Figure 3:
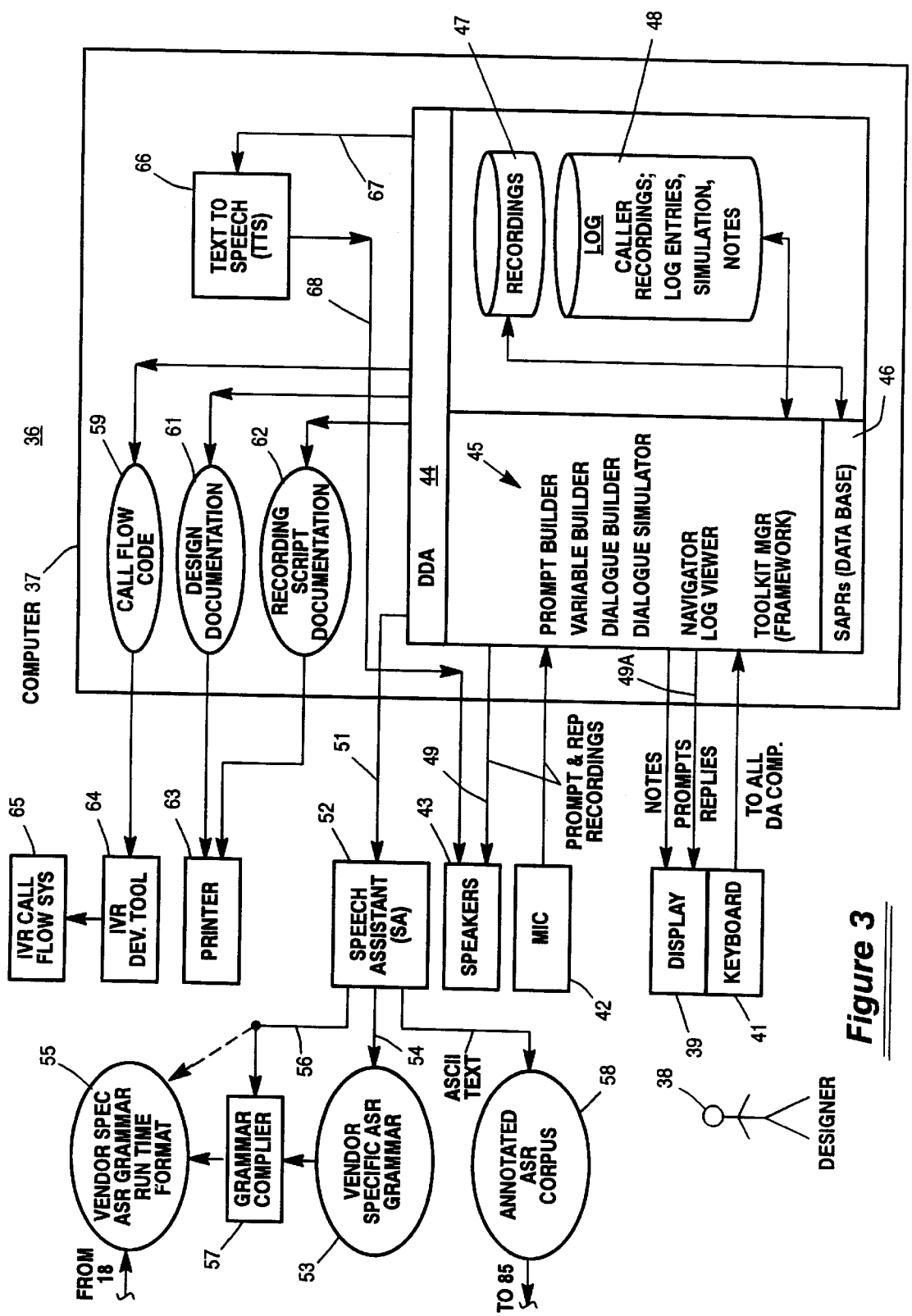
FIG. 3 is a block diagram of the preferred embodiment of the present invention showing the novel design and implementation system for producing feasibility programs, evaluation programs and validated overall design programs.

Refer now to FIG. 3 which is a preferred embodiment of the present invention showing the novel design and implementation system 36 for producing feasibility programs, evaluation programs and validated overall design programs. In this embodiment the designer 38 has at his disposal a display 39, keyboard 41, a microphone 42 and speakers 43 that are coupled to a Dialogue Assistant (DA) 44. Inside the DA 44 there are shown a plurality of components 45 shown as a prompt builder, a variable builder, a dialogue state builder, a dialogue simulator, a navigator, a log viewer, and a tool kit manager. Other components could be placed in the DA as will be explained. The Speech Assistant Project Repository (SAPR) 46 is a database that is used by the DA for its various purposes and the SAPR 46 has its own memory for text of prompts and replies and has a memory 47 for recordings in a wave file equivalent of the prompts and replies. SAPR also contains compartments and dialogue flow as well as variables. A further database or log 48 is employed for storing caller recordings, log entries, simulation notes, etc. The information in SAPR 46 can be called up by the designer and presented by the display 39 or by speakers 43, thus, the designer *by using his microphone 42 can make up any sound or recording and present it to the DA. The text will be saved in the SAPR and the recording saved in the memory 47. Further, actual caller responses log entries and simulation notes may be stored in log 48 and recalled by the keyboard and designer who plays them on the speakers 43 via line 49. Further, the same information in text form in the DA may be presented via line 51 to the Speech Assistant (SA) 52 which the designer uses via keyboard 41 to produce vendor specific ASR grammar at block 53 via line 54 or to produce vendor specific ASR grammar in run time format in block 55 via line 56 or to employ the grammar compiler 57 to change the information in block 53 to a vendor specific ASR grammar in block 55. Regardless of the form and type of information that is present in block 52 in the SA, it is also used to produce the annotated ASR corpus 58 as will be explained hereinafter.

Further, DA 44 uses the SAPR 46 to produce call flow code at block 59, design documentation at block 61 and/or recording script documentation at block 62. The information in document form in blocks 61 and 62 may be printed out at printer 63 and supplied to an implementator. The call flow code at block 59 may be inputted into a IVR development tool 64 which converts the textual information to a IVR call flow system in block 65.

Any of the prompts and replies that were inputted in the DA system in textual form may be outputted on line 67 to a text to speech converter 66 for presentation on line 68 as digital audio for presentation at the speakers 43 so that the designer 38 can immediately check any of the prompts and replies inputted into the system. Further, the designer has the unique ability to listen to any prompt or reply in the manner in which an actual caller would listen to the prompt or reply.

Figure 4:
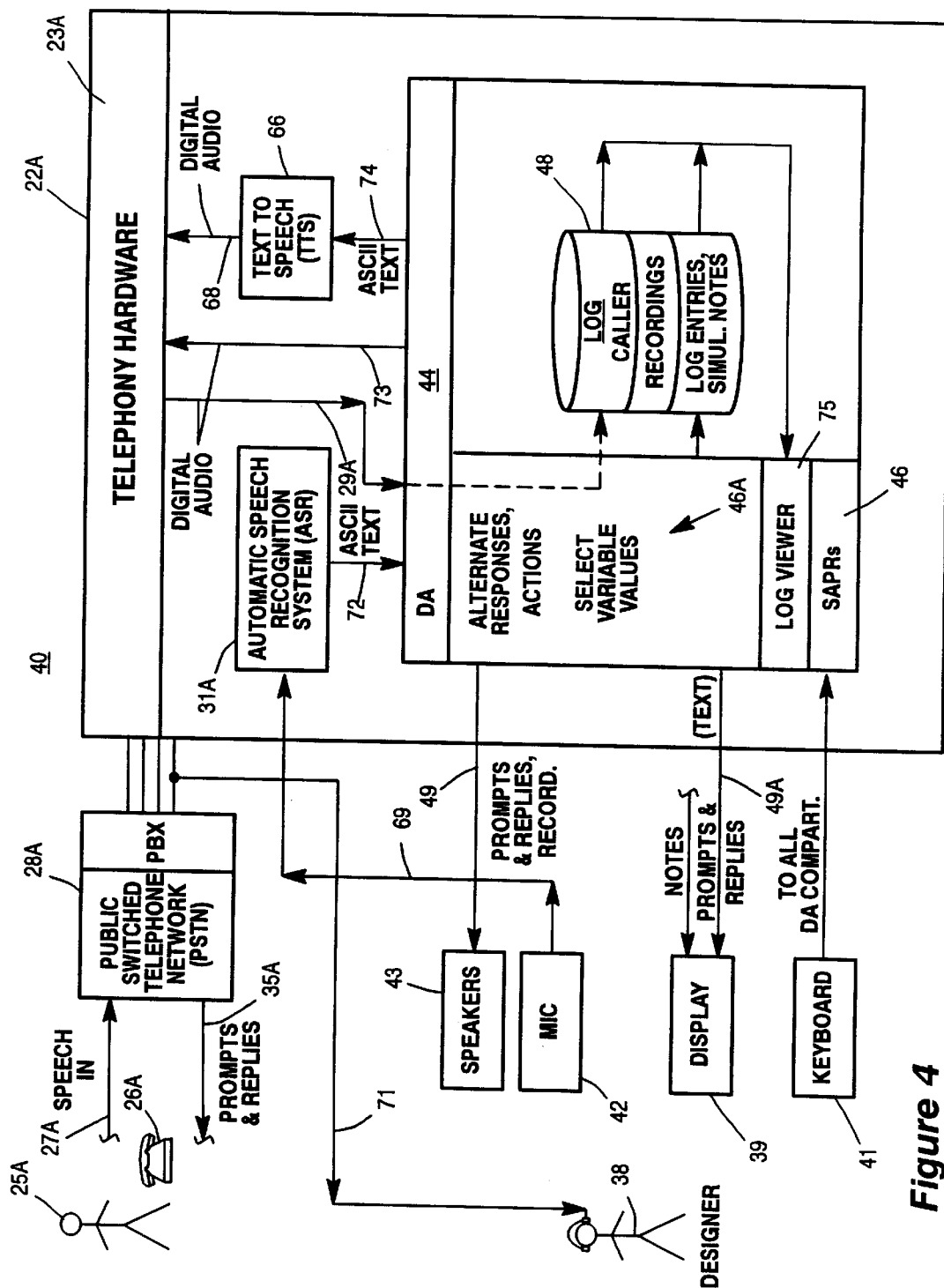
FIG. 4 is a block diagram of the present invention showing the novel DA of FIG. 3 being utilized in a Dialogue Simulator (DS)

Refer now to FIG. 4 showing a block diagram of the present invention having a novel DA utilized in a DA simulation system. In this FIG. 4 the numerals that are the same as those used in FIGS. 2 and 3 represent similar or identical structure and mode of operation and are numbered the same. The caller 25A via telephone 26A speaks into the system 40 via line 27A. The spoken words enter through the telephone system 28A to a computer 22A having telephony hardware 23A. The speech on line 27A is also connected via an audio line 71 to the designer 38. Alternatively, the speech on line 27A may be presented through the telephony hardware 23A to line 29A in digital format to the DA 44 and heard by the designer via speakers 43 and line 49. In either case the designer using the keyboard 41 specifies to the DA 44 the proper simulation step to take. Alternatively, the designer can speak into the microphone 42 and the ASR system 31A can convert that speech to digital audio on line 72 which is then presented to the DA 44. In either case the caller's voice can be recorded and saved in log 48. The dialogue simulator executes call flow in accordance with the design such that a prompted reply can be played back to the caller via line 73 or as digital audio via line 74 and text to speech converter 66A and digital audio line 68 through telephony hardware 23A back to the telephone system 28A and line 35A back to the caller 25A.

After completion of the simulation, the log viewer 75 can be used by the designer 38 to review the caller recordings in log 48 to determine the effectiveness of the prompts and replies. This enables the designer 38 to completely monitor and check the effectiveness of the dialogue design before implementation. Further, the log viewer 75 may also be used by the designer 38 to examine the paths taken by calls in the call flow. This also permits the designer to evaluate, monitor and correct the dialogue design.

Figure 5:
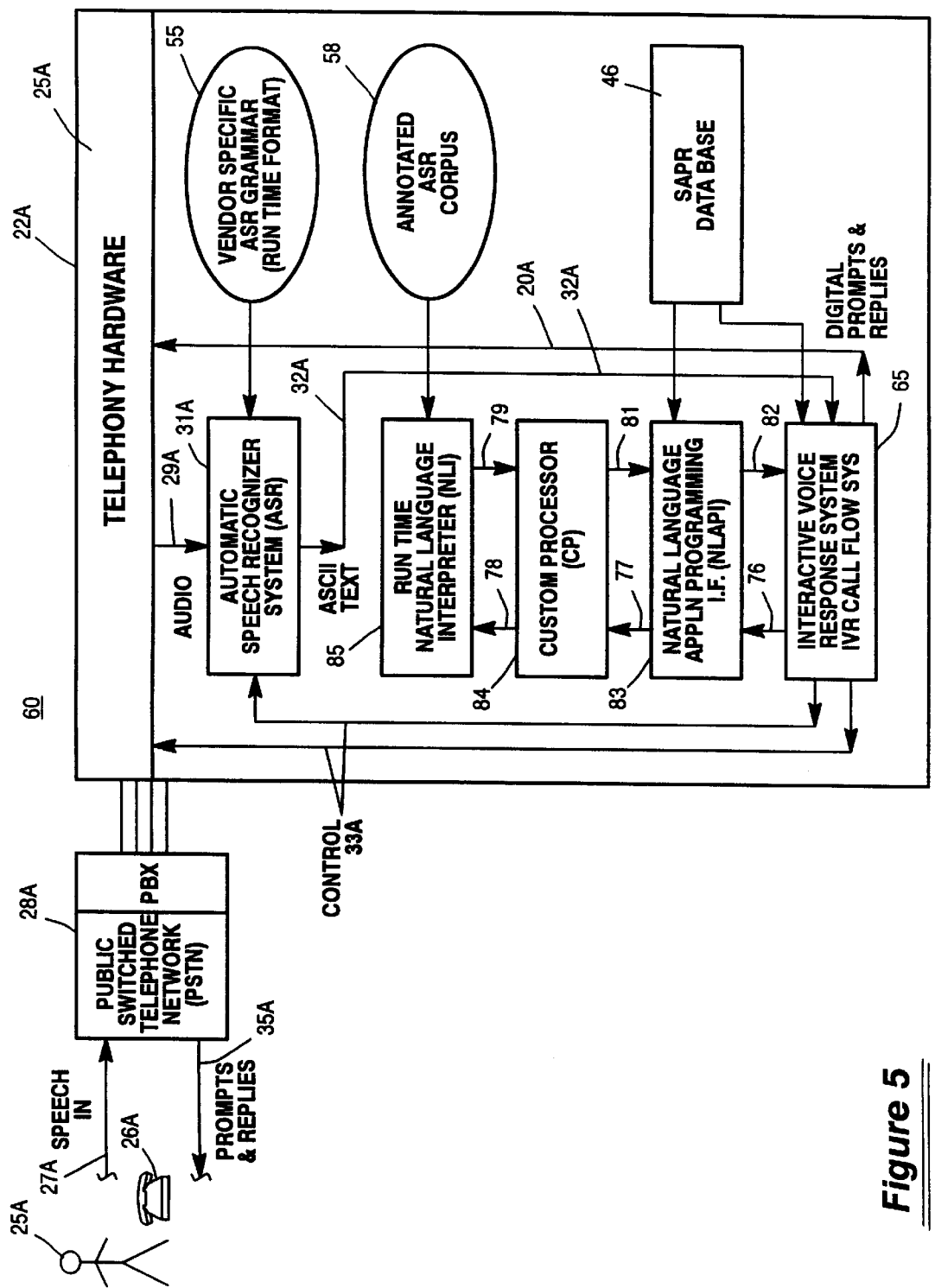
FIG. 5 is a block diagram of the present invention showing the deployable products produced in FIGS. 3 and 4 placed in a run time IVR system.

Refer now to FIG. 5 showing a block diagram of the present invention employable products produced in FIGS. 3 and 4 now shown in a run time system. In run time system 60 the caller 25A enters the audio speech via line 27A, system 28A, telephony hardware 25A to audio line 29A which enters into the ASR system 31A that produces a text output on line 32A to the IVR call flow system 65. The text then passes via line 76 to the natural language application programming interface block 83 and to a Custom Processor (CP) 84 via line 77. The output of CP 84 on line 78 is presented as text to the run time Natural Language Interpreter (NLI) 85 which produces a token that represents the meaning of the text on line 79. This token is passed to the CP 84 which produces an output on line 81 to the Natural Language Application Programming Interface (NLAPI) 83 which produces an output on line 82 to the IVR call flow system 65. It will be understood that the three boxes 83, 84 and 85 comprise a pre-run time subsystem of the NSLA system described herein. Thus, the IVR call flow system 65 used the meaning provided in the aforementioned token on line 82 to produce the digital prompts and replies on line 20A which are received in the telephony hardware 25A as digital audio which passes through the telephone system lines to the caller 25A. The IVR system also uses the token on line 82 to advance the call flow in accordance with the meaning of the caller information which is indicated in the token on line 82. In the embodiment shown it will be understood that the Custom Processor (CP) 84 is a convenient option and may be incorporated in other elements in the natural language system 60.

In the conversion of the audio on line 29A to text on line 32A, the ASR system 31A makes use of the vendor specific ASR grammar in block 55 in performing the conversion to text. The run time (NLI) 85 makes use of the annotated ASR corpus in block 58 to convert the text on line 78 to the token on line 79 which is later converted to meaningful digital prompts and replies by the IVR call flow system 65.

Call flow information created and stored in SAPR 46 is available to NLAPI 83 and IVR system 65 to conduct a dialogue with the caller during run time. A feature of the present invention permits the use of new and improved NLAPI blocks 83 and/or new and improved IVR blocks 65 in conjunction with SAPR block 46 and 46A. The modification allows block 83 and 65 to fetch prompts, caller responses, anticipated responses replies, variables and compartment connectivity from SAPR 46. This enhances the ability of the present invention to create a call flow without having to manually write IVR code as employed in our copending previously referenced U.S. Ser. No. 08/932,938.

Figure 6:
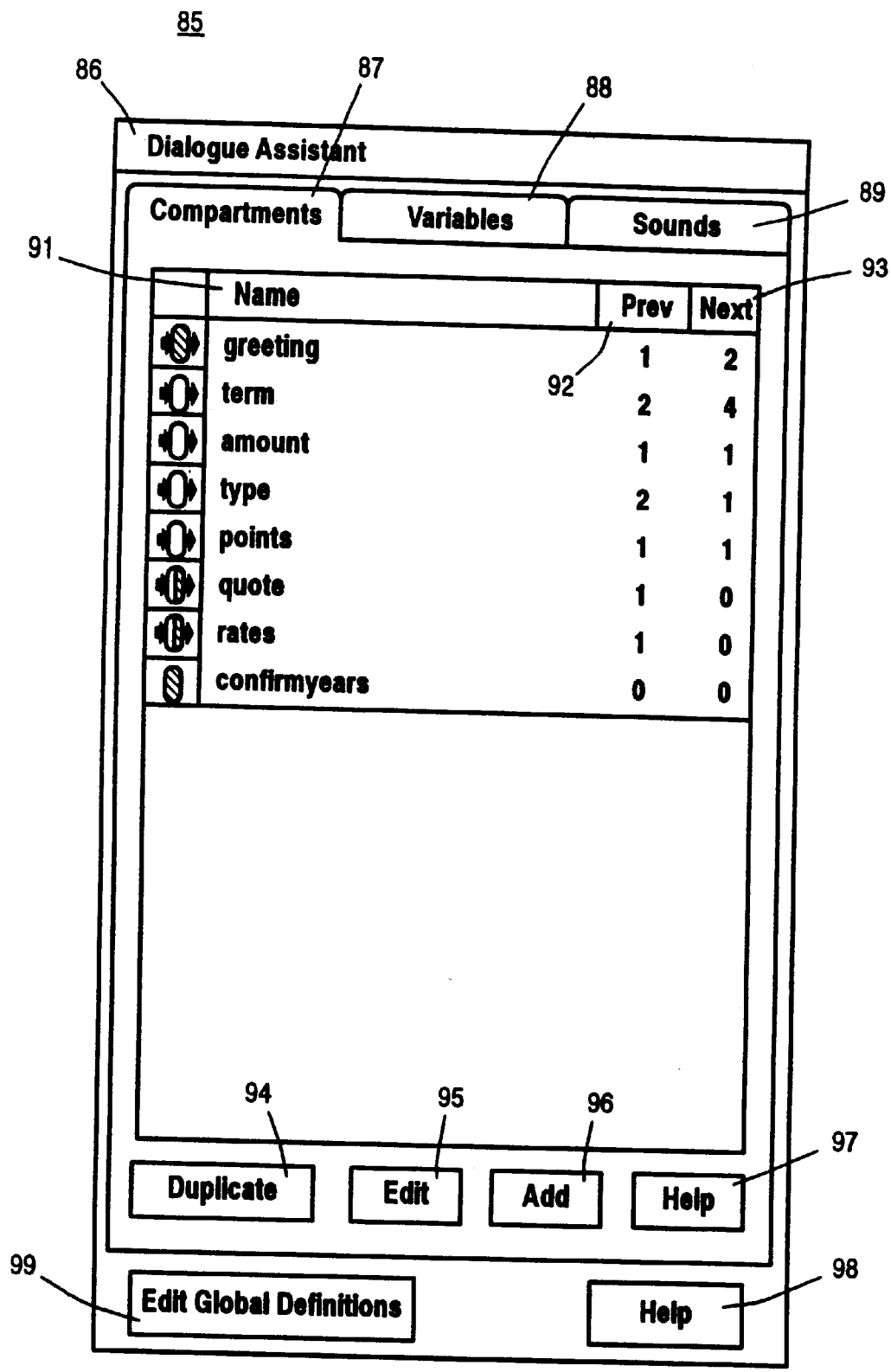
FIG. 6 is a drawing showing a call flow Navigator used to call up the designer screen shown in FIGS. 7 to 9.

Refer now to FIG. 6 showing a call flow Navigator screen that may be presented on the display 39 of the designer 38 shown in FIGS. 3 and 4. These forms or screens shown in FIG. 6 are used to invoke builders for the compartments 87 and builders for the variables 88 and sounds 89. There is shown in a column under "Name" 91 a plurality of eight existing compartments for this particular example. Each compartment is listed by name and to the left of the name of the compartment is a graphical icon that shows the call flow characteristics of the particular compartment. For example, the compartment "confirmyears" has not been connected in the call flow and has no input or output. In contrast thereto, the compartment "term" has been connected in the call flow with both an input and an output. The columns 92 and 93 to the right opposite "term", show that the term compartment has two other compartments that connect into it and four compartments that connect from it. By manipulating the computer mouse this form can be made to display the names of the two compartments represented in column 92 that are connected to the term compartments. Similarly, the column 93 permits the designer to determine those compartments to which the "term" compartment connects. The eight compartments shown are a specific example and may not include all possible compartments needed. It is possible to duplicate any one of the compartments with button 94 which may then be edited by edit button 95 or an existing compartment may be edited. Similarly, a compartment may be added by button 96 and if there is any specific reason for needing help, the help button 97 may be used whereas if only general information is needed, button 98 is used. Button 99 permits the designer to review and change global definitions of prompts, caller responses and actions. Those familiar with the computer mouse manipulation and selection techniques will understand the use of the buttons.

Figure 7:
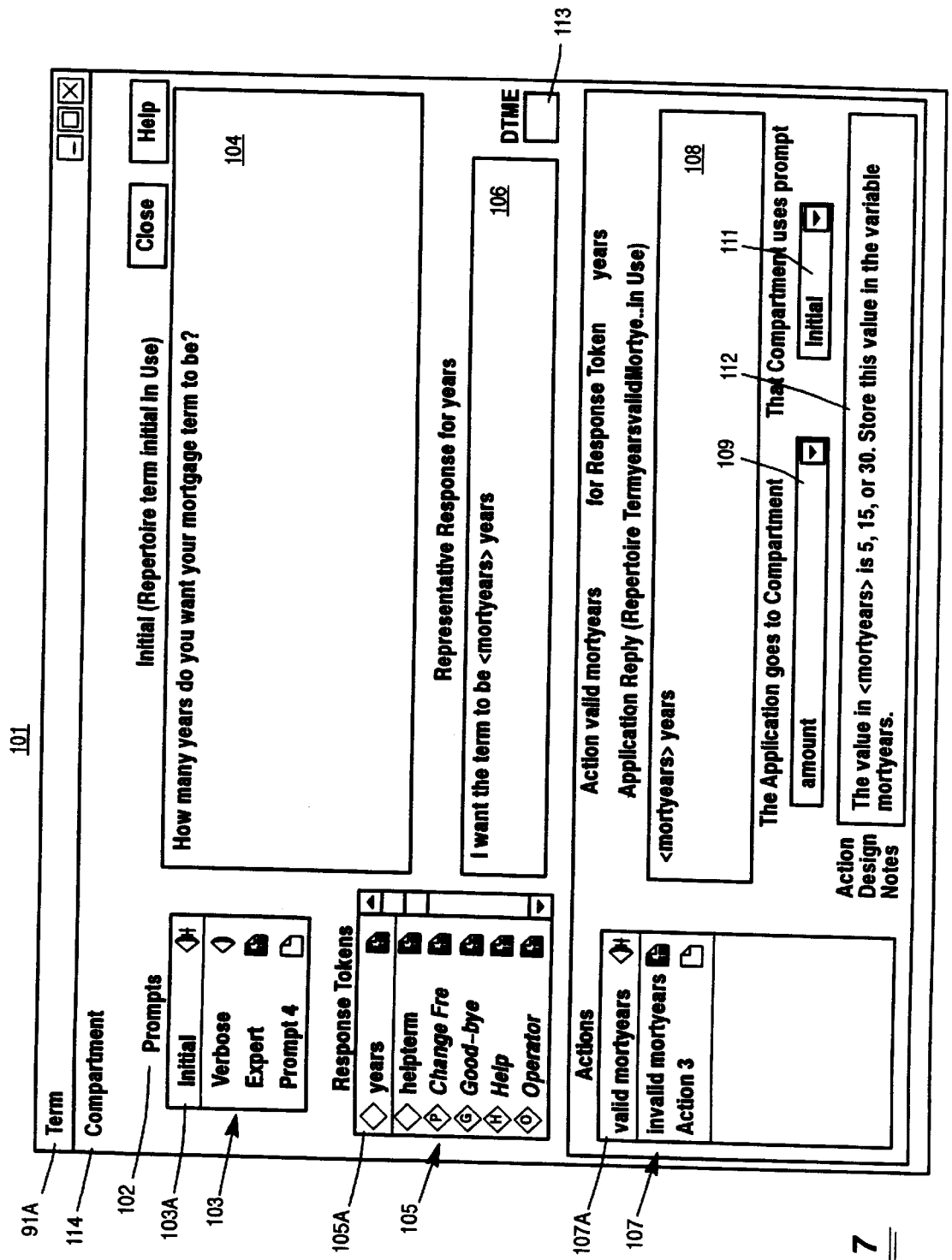
FIG. 7 is a drawing showing a designer screen used by the designer to design, edit and build compartments or dialogue states.

Refer now to FIG. 7 showing a designer screen or form 101 used by the designer to design compartments. In the preferred use of this Dialogue State Builder (DSB) form, its associated navigator screen shown in FIG. 6, is displayed on the display at the same time. This sample form 101 is for the title name "term" which is by definition a compartment shown in FIG. 6. Refer now to Form 101 used by the designer to design or build compartments. In this case the form 101 has a caption 91A entitled "term", thus the compartment term can be designed using the form 101. For example, there are a list of prompts 103, 103A under the caption "Prompts" at 102. The first or "Initial" prompt is highlighted as having been selected in the prompt selection box. This prompt calls up text defining the prompt displayed to the right in box 104 which is the prompt edit box. If there had been no compartment for "term", the prompt edit box 104 would be blank and would have to be filled in by the designer. However, if the compartment exists previously, the prompt edit box will have the concurrent defined value for each of the prompts 103 shown in the prompt selection box. These prompts in the prompt selection box have icons to the right of each of the prompts indicating the status of the contents of the prompt. For example, the initial prompt is mapped to a sound and there is a prerecorded sound. Verbose is mapped to a sound alone and there is no recording. The prompt "Expert" has no mapped sound but has text recorded. "Prompt 4" is not mapped to sound and no text recorded. In a similar manner, the "Response Tokens" box 105 has a plurality of response tokens each of which represents an alternative response thus, anticipates caller responses. In this example the response token 105A for "years" indicates that the response edit box 106 contains text representing that response. Clicking on block 106 will pull up the Response Builder (RB) screen which is provided in the Speech Assistant (SA) 52 shown in FIG. 3. These components RB and SA are explained in our previous referenced U.S. Ser. No. 08/932,937, see especially FIG. 2 and the Speech Assistant (SA).

The "Actions" selection box 107 shows that the selected highlighted valid mortgage years 107A is mapped to sound and that the information reply edit box 108 contains information. For the selected action 107A (valid mortgage years), compartment 109 indicates that the compartment next goes to "amount" when the action indicated in 107A is taken in either the DA simulation or IVR construction mode. The prompt 111 indicates "Initial" and is the prompt to be played by the compartment 109. There is further provided at the bottom of the form 101 a compartment 112 for an "Action Design Notes" which enables the designer to enter useful information in note form for use by the implementer. The DTMF edit box 113 is used by the designer to assign a telephone keypad digit to a response like 105A if the design calls for a DTMF input by a caller in substitution for voice speech. The menu in 114 entitled "Compartment" permits the designer to rename the compartment and to provide compartment design notes for the benefit of the implementer.

Having explained one form 101 it will now be appreciated that the information in the edit boxes and all other information on the form can be printed out on the printer 63 from the design documentation block 61. Thus, the designer and user can communicate to the implementer exactly what prompts and replies have been built into the system 36.

Figure 8:
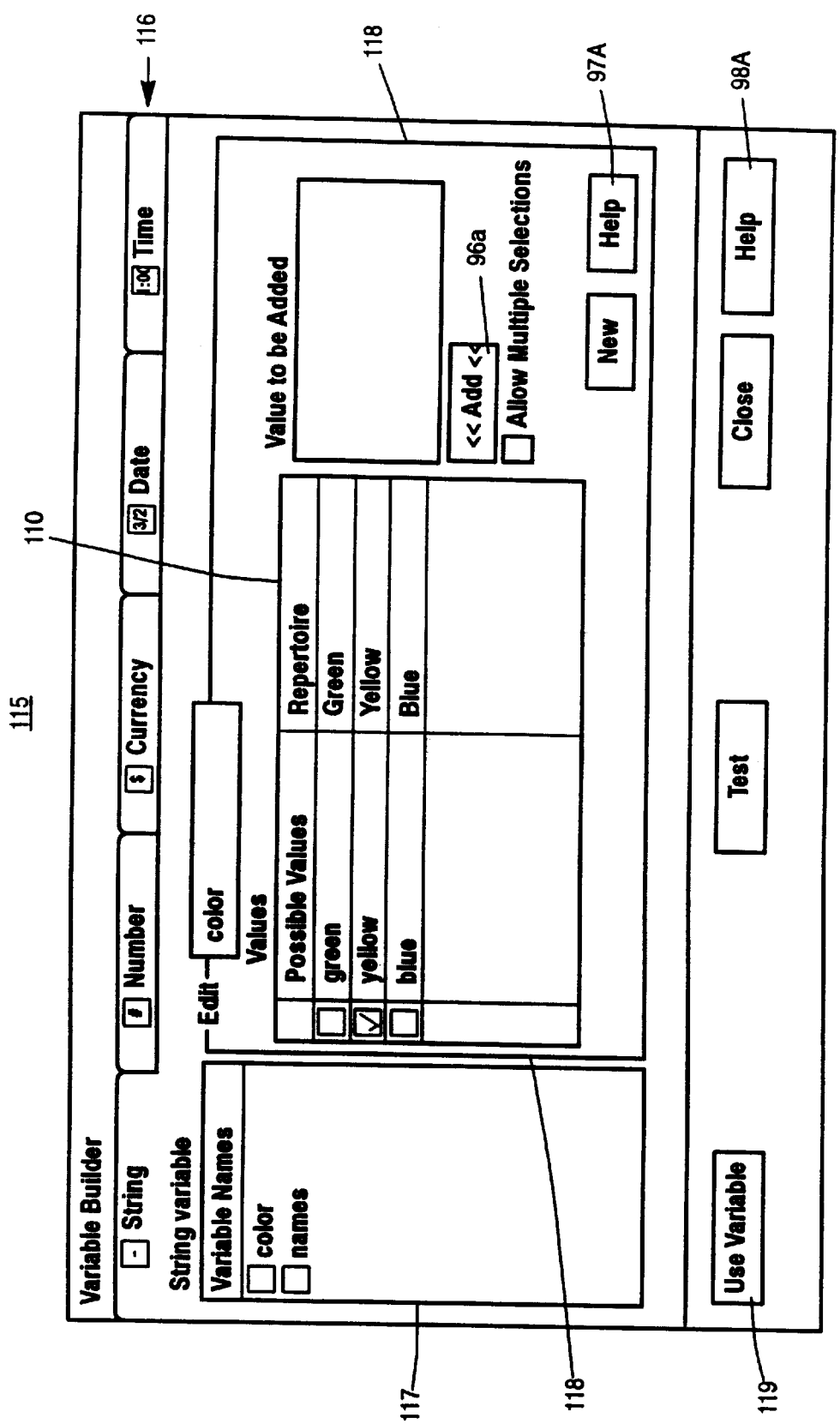
FIG. 8 is a drawing showing a designer screen used to design variables.

Refer now to FIG. 8 showing a designer screen or form 115 used to design variables. It will be recalled that the navigator shown in FIG. 6 has a variable tab 88 which will allow the designer to call up form 115 for creating and editing variables. The top horizontal row of five types of variables 116 includes a variable designated "String". The string variables selection box has two variables of the string type indicated as color and names. Values box 110 shows several "Possible Values" of color including yellow which is active. Associated with the selection box 117 is a work area. Associated edit box 118 displays possible values etc. and permits alterations of the attributes of the variable selected in selection box 117. Thus, it will be understood that the contents of the work area 118 will change every time the variable is changed to enable the designer to change the attributes specific to that variable type selected. In box 118 there is shown an add button 96A and help button 97A which serve the same functions as buttons 96 and 97 explained in hereinbefore. Also, there are shown buttons that have self explanatory meanings along the bottom of the form 115 including button 119 entitled "Used Variable." When this button is selected the use of the color variable is used in a prompt, caller response, or reply.

Figure 9:
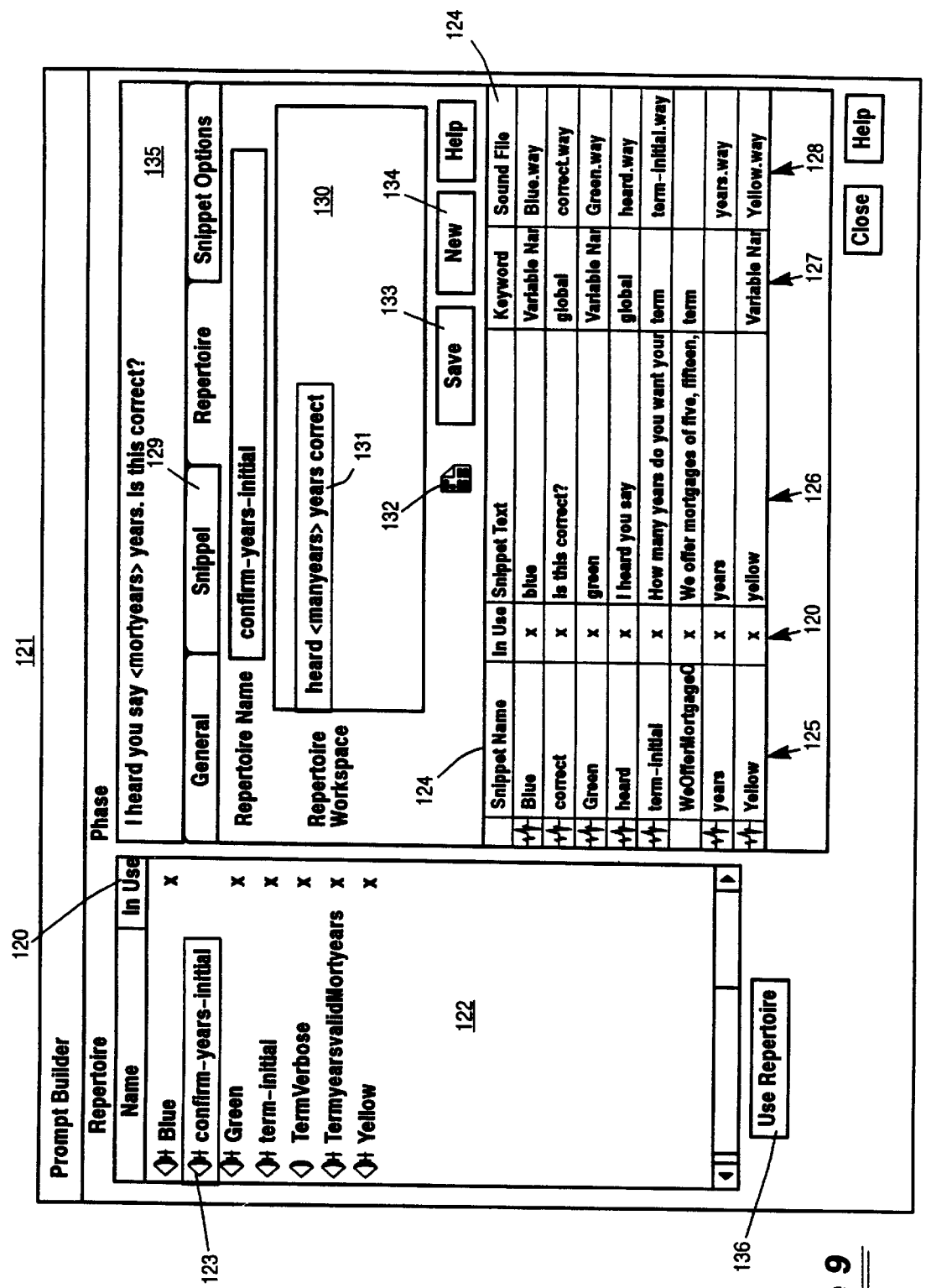
FIG. 9 is a drawing showing a designer screen used to design sounds or prompts and variables.

Refer now to FIG. 9 showing a drawing of a designer screen or form 121 used to design sounds for prompts, replies and variables that are used in prompts and replies. The form 121 may be accessed by using the navigator 85 shown in FIG. 6 and clicking on the sounds tab 89. It is also possible to access the form or screen 121 from screen 101 shown in FIG. 7 using a pop-up menu in the box 104 or the reply edit box 108. While the majority of recorded sounds are recorded voice, it is also possible to record music or other sounds using the DA. The designer, in the dialogue design mode may use the microphone 42 shown in FIG. 3 and FIG. 4 in conjunction with form 121 to record almost any sound. The repertoire selection box 122 has a caption or heading "Repertoire". Inside of the box 122 there are a plurality of repertoire names and with each repertoire name there is an icon which indicates whether there is a complete set of recordings for that repertoire name. Also, to the right of the repertoire name is a column entitled In Use 120 which indicated whether the named repertoire is use to provide the sounds for a prompt, a reply or a value. Associated with repertoire selection box 122 is a "snippet" selection box 124 which includes one row for each of the snippet names. The snippet names are shown in column 125 and snippet texts or attributes are shown in column 126. It is possible to assign one or more key words to a snippet as shown in column 127 to permit the designer to retrieve all snippets which match a desired key word. By this means a designer can restrict his search to only those snippets of particular interest for the design on hand. Column 128 shows the existence of a recorded wave file for the snippet names in column 125. The repertoire work space 130 also serves as a snippet work space when the "Snippet" tab 129 is selected. The use of the repertoire work space 130 permits the designer to drag snippet names from column 125 into the work space 130 to form an ordered list of snippets that comprise the repertoire being designed. For example, the ordered list of snippet names 123 comprises the repertoire "confirmed years initial" being designed and prompt information 131 also shows that other variables may be inserted in the ordered list. Assume that the variable mort years is 7, then the ordered list information 131 would produce the sound "I heard you say seven years. Is this correct?". After the designer designs a concatenated series of snippet names and variables, it is possible to play back the concatenated sounds by using a menu available in the repertoire selection box. It will be appreciated that when the snippet tab 129 is selected, the work space 130 becomes a snippet work space and includes play and record buttons and a snippet edit box where the text for a snippet is defined.

Box 135 contains information which is the prompt reply from form 101 in FIG. 7. This reply may be dragged down into the snippet work space 130 when tab 129 is selected. By this means the text of the snippet can be derived and then additional textual information may be added by the keyboard of the designer. Subsequently, the before-mentioned play and record buttons (not shown) may be used to record the text of the designer's voice and to play back a recording. Buttons 133 and 134 are associated with the work space 130 and may be used for either snippets or repertoires to save or create new repertoires and snippets.

Having explained a manual use of the screen or form 121 it will now be appreciated that form 101 and FIG. 7 will permit automatic creation of snippets with use of the form 121. For example, a prompt or reply in box 104 or 108 will permit a menu selection for automatic creation of the necessary snippets and catenation of those snippets in work space 130 into a desired repertoire so that the designer may use solution tab 136 to select that repertoire as the mapped sound for the prompt 104 or the repertoire 108. Thus, by having the two screens 101 and 121 on the same display at the same time it is possible for the designer to use screen 101 and button 136 to automatically produce mapped sounds. In either event, regardless of how the information on FIG. 9 is produced when the save button 133 is depressed or tabbed, the repertoire or snippet is saved in the SAPR 46 shown in FIG. 3 and the recordings are saved in the memory 47. FIG. 3 also shows where the designer 38 is located when operating on screens 101 and/or 121.

Refer to FIG. 9 showing a column of variable values under the caption Repertoire at 122. To manually map sounds to a value of a string variable such as green-yellow-blue in FIG. 8, the designer would select the value green in box 110 and use mouse techniques to go to form 121 to create the snippet for green in column 125 using work space 130 and drag that snippet into a repertoire named green in the work space 130. After having created the repertoire the designer tabs the use button 136 to specify that repertoire for use as the mapped sound for a string value green in form 115. Alternatively, a designer can use a pop-up menu for the string value green in box 110 to cause the necessary snippet and its repertoire to be automatically created on form 121. Thus, all the designer has to do in the automatic mode is to press tab 136 to map the selected repertoire to string green in block 110.

Figure 10:
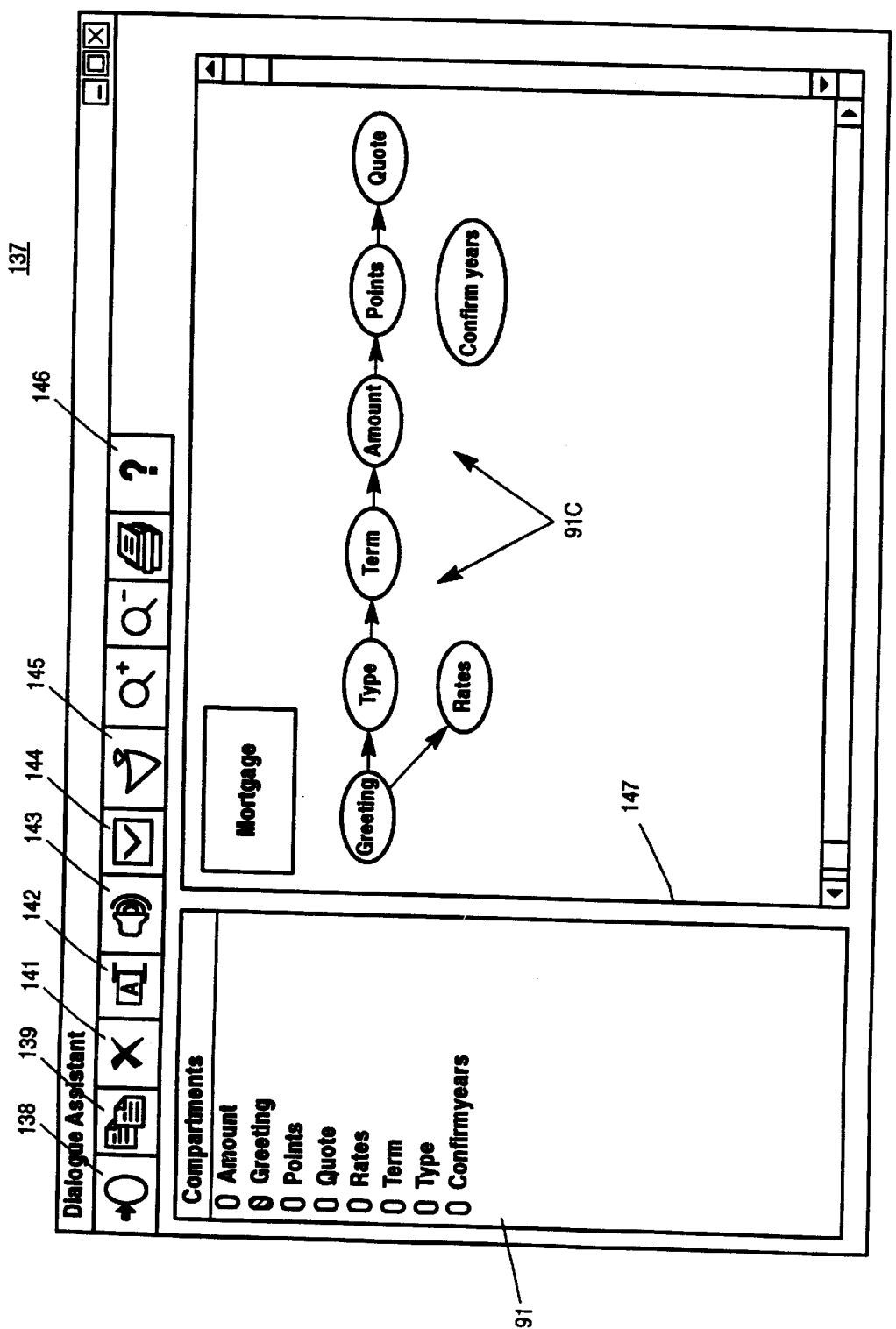
FIG. 10 is a block diagram showing a modified Navigator having a flow diagram of connected compartments created by a designer which define a dialogue flow.

Refer now to FIG. 10 showing a drawing of a modified navigator of the type shown in FIG. 6 and further showing the connection of compartments which define dialogue flow. This screen or form 137 is provided with the same listing or column of compartments 91 as shown in FIG. 6. However, across the top of the screen there appears a plurality of tab bar buttons used for selection and functions to be described hereinafter. The button 138 is used to add compartments. The button 139 is used to duplicate compartments. The button 141 is used to delete compartments. The button 142 is used to rename compartments. The button 143 is used to launch the prompt builder. The button 144 is used to launch the variable builder. The button 145 is used to launch the dialogue simulator which will be shown and described hereinafter. The last button 146 is used as the help button and other buttons are self descriptive. After designing the compartments using the aforementioned drawings the designer may observe the various compartments shown at 91C being connected one to another as he progresses with his design. The connectivity in dialogue flow box 147 is the dialogue flow. It will be noted that the confirmed years is not a connected compartment and can be used but does not form part of the dialogue flow.

Refer now to FIG. 11 showing a main display or form 148 which appears on the display screen during simulation and test. It will be noted that across the top of the form or screen 148 there are a plurality of function buttons which will be explained hereinafter and along the left hand side or column there are a plurality of buttons F1 to F10 which may be use for simulation and control. The function buttons labeled F1 through F10 may be mouse activated or by the corresponded function keys on the keyboard 41 shown in FIG. 3. The F1 button is self explanatory for help. The F2 toggle button 149 activates automatic recognition of call DTMF inputs when caller responses have DTMF key strokes assigned to them. These responses have only one possible action and the simulator will automatically transition dialogue flow. When the F2 toggle 149 is toggled off, then the caller DTMF key strokes will not be automatically transitioned. The button 150 enables a prompt or reply being played to be surpressed or made silent. Button 151 may start a simulation under various circumstances. In one case, if button 157 is not selected, then button 151 may start a desk top simulation where no telephone is used. Prompts and replies are played to the speakers in FIG. 3. Alternatively, button 157 is enabled when F6 toggle 152 is on, then 151 is disabled. In a third case, if 157 is activated on and 152 is off, then an incoming call will not be answered until the F5 button 151 is depressed. In summary it should be understood that if the 157 button is activated, then incoming calls are simulated. Button 152 then determines if the call is automatically answered. However, if F6 152 is off, then F5 button 151 must be depressed in order to answer the caller. If the F7 button 153 is on for a variables optional, then the designer need not collect values for active variables in box 159 before proceeding with the dialogue flow. If the button 153 is off then the designer must collect a value from box 159 for each active variable before proceeding. F8 button 154 serves as a convenience function for global variables and permits the value for any of the variables in box 164 to be collected. F9 button 155 launches the log viewer shown in FIG. 3 on the active log for the current simulation. F10 button 156 permits the designer to configure the telephone hardware shown in FIG. 4 as well as other simulation attributes such as recording caller utterances that are saved in log 48 shown in FIGS. 3 and 4.

Form 148 is a true example of a simulator in use and the title shows that the compartment term is now being simulated. Within the screen 148 the caller response token box 105B shows all of the response tokens defined for the active compartment "Term". To the left of the listed tokens there are shown graphic indicators 105A. Some of the tokens are identified by letters of the alphabet. The response tokens which have letters in column 105A may be invoked by the letter key stroke of the keyboard 41 or may be invoked by the mouse keying on the token name. It will be understood that the standard responses are predefined and the designer can examine the pre-design standard response by using button 99 shown in FIG. 6 of the navigator.

The active variable selection box 159 shows by name the those variables that are to be collected in this compartment, that is, those variables for which values are to be assigned by the designer in order to simulate the compartment.

In box 159 opposite the active variable number (#) mort years there is shown a value of 30 indicating that the designer has entered 30 years for this variable. In order to obtain this variable refer to FIG. 4 where the designer 38 was either listening by earphones or through speakers to the caller 28A who responded to a prompt of how many years do you want your mortgage to be, and has replied 30 years. In order to get the 30 years entered into the variable box, a collector 168 is employed by the designer for mort years. The collector 168 comprises a display and a keypad similar to a calculator in which the designer enters numbers and then depresses the "ok" key 172 to enter the value of the variable. It will be understood that there is a different collector similar to collector 168 for each of the variable types listed on form 115 (FIG. 8) and enumerated at 116 as string, number, currency, date and time. Collector 168 has a clear key (c) 173, an enter key (ok) 172 and decimal keys 171 for the keypad 169. other collectors may vary to suit the needs for other variable types of data.

There is provided on screen 148 an abort simulation button 165 which when depressed will abort the simulation in progress causing any telephone call to be ended. The exit button 166 is disabled during a simulation and when enabled and depressed causes the simulator to be dismissed from the display. Box 167 is a replica of a DTMF keypad and permits the designer to simulate DTMF key strokes that would be entered by a caller. Box 167 is used when simulating without an actual caller or an actual telephone to generate the DTMF tones.

The designer having selected a caller response from the list in 105B response token box raises the alternative actions for the selected response that are displayed and shown in action selection box 107B. The designer may then select the appropriate action by using mouse techniques on the possible actions. If the selected action in 107B has an associated reply, that reply will be played to the caller and displayed in the display selection box 104 of the display 148. In addition, the next compartment in the dialogue flow is displayed as a caption in the button 161 and is shown as "amount". The amount screen may be raised as a compartment using button 161.

Once the designer has completed simulating the active compartments under consideration, the designer may then depress the go button 161 and the simulator will automatically transition to the next compartment in the dialogue flow indicated to be "amount" in button 161. It will be understood that the designer is not limited to mouse techniques but may use other key strokes and functions to accomplish the same transition task to other tasks and compartments.

Box 164 is entitled "All Project Variables" and contains the names of all of the variables which have been defined for the dialogue design being simulated. This permits the designer to collect a value for any variable at any time by keying on the name of the variable in box 164. The column of graphic indicators 163 opposite the name of the variables are used to assist the designer in recognizing the type of variable associated with a name.

It will be understood that during a simulation, selected entries are made automatically into the simulation log 48 that characterize the caller experience in terms of time intervals, caller responses, and compartment transitions. It is these log entries made during a simulation as well as the recordings made of caller utterances that permit the designer after completing the simulation to review the effectiveness of each compartment with each caller to determine in detail any necessary improvements to the design. It is a major feature of the present invention to permit the designer to monitor and review and even make additional corrections during a simulation. Once the designer has played back the proposed simulation he may make corrections or amendments or modifications thereto until he is satisfied with the design.

Figure 12:
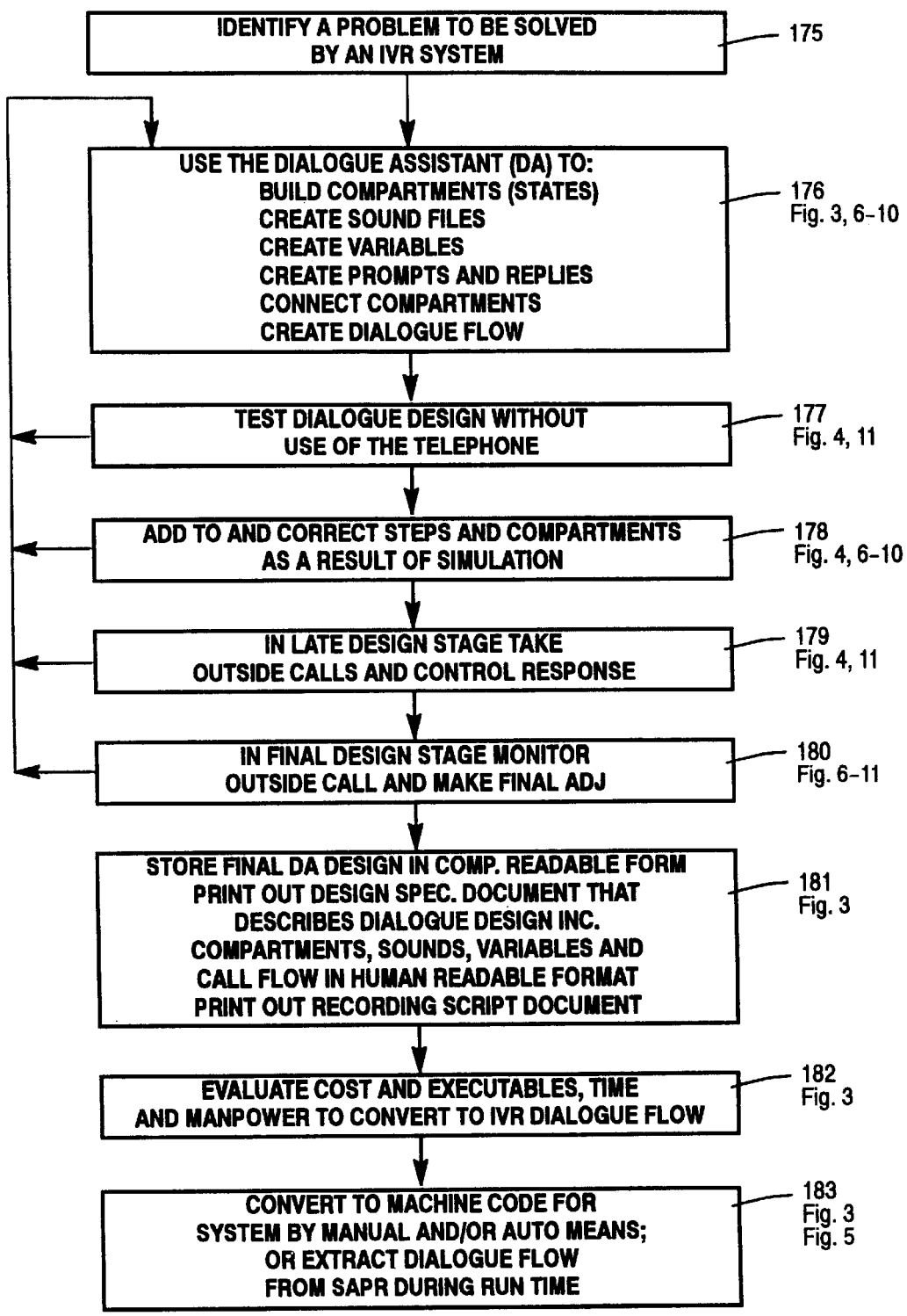
FIG. 12 is a block diagram showing the principle steps and procedures used by the designer/simulator to create a call flow program for an IVR system.

Refer now to FIG. 12 showing a block diagram of the principle steps and procedures used by designers and implementers to create call flow programs for a IVR system. Box 175 starts the design process by identifying a problem to be solved when creating a IVR system. In order to implement this idea or solve this problem, the designer uses the tools shown in FIGS. 3, and 6 to 10 which are briefly enumerated in block 176 to produce a call flow design. Box 177 shows that the designer may test his dialogue design without use of the telephone and an actual caller before refining his design by reference to callers. Box 178 shows that the designer can refine his design in block 178 by repeating the task shown in blocks 176 and 177 until satisfied. These tasks are shown in FIGS. 4, and 6 to 10. Once satisfied with the design the designer may now take outside calls and control responses to the calls as shown in block 179 to further perfect the design. Also he can further refine the system by repeating the loops in the blocks above. In the final design stages shown in block 180 the designer usually monitors the outside calls and/or makes any final adjustments necessary. In block 181 the final design is stored in the SAPA 46. Any files associated with the design in SAPR are stored in the memory 47. Now the design may be may be expressed with written documentation by printing out or conveying the information electronically as shown in block 181 and in FIG. 3. Block 182 shows that the documentation produced in block 181 may now be used to evaluate the cost of the executables as well as the time and man power which would be required to convert the IVR call flow or portions thereof, to machine code form. Block 183 shows that the IVR call flow in block 101 may be converted automatically to machine code by the DA 44 using the SAPR 46 and producing call flow code at block 59 in FIG. 3.

Having explained the steps employed in FIG. 12 it should be understood that the designer can now create a dialogue design and through simulation by use of the DA refine and improve the design so that the implemented system will be proven or known to be effective. Alternatively, it will be appreciated that the conversion to machine code by the DA and the SAPR using the call flow code converter 59 enables the designer to further enhance any final version of the machine code knowing that the machine code already written is operable. It has been found advisable when using automatic implementation to written code to divide the call flow application into stop points or check points. This procedure has several advantages in that the call flow application has portions that are directly usable in other applications or can easily be modified for use in other applications. Even though the simulation system should insure that an automatic code implementation may be written, it may be wiser to manually code some portion of the call flow that would not be cost effectively converted by the converter employed. Last but not least, automatic implementation in parts permits conversion now and the ability to intervene and check the effectiveness and accuracy of automatic conversion. Thus, the converter employed can be improved and/or changed and remain compatible with the earlier designed automatic code converter.

What is claimed is:

1. A dialogue design system for creating compartments of a dialogue flow, comprising:

computer means having a visual display and input control means, sound means coupled to said computer means including sound input means and sound output means, a Dialogue Assistant (DA) in said computer means, said DA comprising a plurality of compartments accessible from said input control means, said DA comprising a navigator screen having means for selecting editing screens for compartments of variables or sounds, each of said compartments having an associated dialogue design screen for presentation on said visual display and being accessible from said input control means, each of said dialogue design screen having a plurality of prompts and responses, edit box means associated with ones of said prompts and responses for editing prompts and responses, means for storing voice and sounds to be used with edited prompts and responses, and said input control means comprising means for connecting edited prompts and responses to generate edited compartments of a dialogue flow.

2. A dialogue design system as set forth in claim 1 wherein said editing screen for compartments provides a means for selecting screens for variables, sounds and grammars.

3. A dialogue design system as set forth in claim 2 wherein said editing screen for compartments provides a means for constructing compartments with variables and sounds.

4. A dialogue design system as set forth in claim 3 wherein said DA includes a database repository for storing said compartments with variables and sounds.

5. A dialogue design system as set forth in claim 3 wherein said compartments and variables and sounds are stored in said DA in a sequence which permits playback by a designer to simulate a run time interactive voice response (IVR) system.

6. A dialogue design system as set forth in claim 3 wherein said compartments are edited and stored in said DA in a sequence which permits playback by a designer to simulate a run time of plural compartments.

7. A dialogue design system as set forth in claim 6 wherein said input control means is provided with selection means for simulating in play back mode a compartment or sequence of compartments defining a dialogue flow.

8. A dialogue design system for simulating a dialogue flow application, comprising computer means having a visual display and input control means, a dialogue assistant (DA) in said computer means comprising means for selecting editing screens, a plurality of designer screens in said DA accessible from said input control means, means for accessing a designer screen for a compartment in said DA, each said designer screens having means for drafting the dialogue and generating sound files for prompts and replies of the compartments of a dialogue application, means in said DA for anticipating caller responses to prompts and response tokens, means in said DA for recording caller responses to prompts and tokens, means in said DA for editing and refining caller prompts and replies to be used in the compartments of a dialogue application, means in said DA for storing the edited compartments of a dialogue application, and said input control means comprising means for connecting the edited compartments in a simulated dialogue flow application.

9. A dialogue design system as set forth in claim 8 which further includes means for playing back in a simulation mode said stored edited compartments.

10. A dialogue design system as set forth in claim 9 wherein said input control means includes means for monitoring callers questions and answers and prompts and replies generated by said DA.

11. A dialogue design system as set forth in claim 10 wherein said DA includes means for making notes and observations during a simulation mode run, and means for refining and editing said compartments in response to callers use of the DA.

12. A dialogue design system as set forth in claim 11 which further includes means for printing out design documentation and script documentation of refined and edited compartments.

13. A dialogue design system as set forth in claim 8 which further includes means for converting the refined and edited compartment of a dialogue application stored in said DA to a standard format for use by standard Interactive Voice Response (IVR) equipment.

14. The method of making a dialogue application for use in an Interactive Voice Response (IVR) systems, comprising the steps of:

defining the dialogue application in terms of compartments, designing each compartment with a Dialogue Assistant (DA) to include sound files and variables and prompts and replies, providing a navigator screen in said DA for selecting editing screens for different compartments, selecting editing screens for the design of said compartments, confirming proper design of compartments by simulation test, storing said edited and confirming compartments in a database in a computer readable form, connecting said compartments in a dialogue flow format, and extracting said stored dialogue flow for use in said dialogue application by said IVR systems.

15. The method as set forth in claim 14 wherein the step of extracting stored dialogue flow in said database comprises the step of converting stored dialogue to machine code for use by said IVR system.

16. The method as set forth in claim 14 wherein said step of designing comprises, displaying on the screen of said computer a listing of the compartments to be used in said dialogue, and the step of designing each compartment comprises the step of displaying on the computer screen a design screen for each compartment to be edited.

17. The method as set forth in claim 16 which further includes the step of displaying a navigator screen for designing and connecting compartments.

18. The method as set forth in claim 15 wherein the step of extracting said stored compartments comprises conversion into a standard machine code format readable by standard IVR systems.

* * * * *